(12) United States Patent
Suchak

(10) Patent No.: US 8,444,942 B2
(45) Date of Patent: *May 21, 2013

(54) PROCESS FOR REMOVING CONTAMINANTS FROM GAS STREAMS

(75) Inventor: Naresh Suchak, Glen Rock, NY (US)

(73) Assignee: Linde Aktiengesellschaft, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/362,025

(22) Filed: Jan. 31, 2012

(65) Prior Publication Data

US 2013/0028821 A1  Jan. 31, 2013

Related U.S. Application Data

(60) Provisional application No. 61/438,293, filed on Feb. 1, 2011.

(51) Int. Cl.
| | |
|---|---|
| *B01D 53/14* | (2006.01) |
| *B01D 53/56* | (2006.01) |
| *B01D 53/74* | (2006.01) |
| *B01D 53/75* | (2006.01) |
| *C01B 17/69* | (2006.01) |
| *C01B 17/90* | (2006.01) |

(52) U.S. Cl.
USPC ........ 423/210; 423/215.5; 423/235; 423/522; 423/523

(58) Field of Classification Search
USPC ............. 423/210, 215.5, 235, 522, 523
See application file for complete search history.

(56) References Cited

U.S. PATENT DOCUMENTS 7,632,475 B2 * 12/2009 Suchak et al. ............ 423/210
7,964,166 B2    6/2011 Suchak

FOREIGN PATENT DOCUMENTS

JP         55-11033 A  *  1/1980

* cited by examiner

*Primary Examiner* — Timothy Vanoy
(74) *Attorney, Agent, or Firm* — Philip H. Von Neida

(57) ABSTRACT

The present invention provides for process for inhibiting the levels of nitrogen oxides in process gas streams from sulfuric acid regeneration and sulfuric acid production plants. Partial oxidation of the nitrogen oxides is achieved by feeding a sub stoichiometric amount of ozone as to nitrogen oxides to the process gas stream.

24 Claims, 4 Drawing Sheets

PROCESS FOR REMOVING CONTAMINANTS FROM GAS STREAMS

CROSS REFERENCE TO RELATED APPLICATIONS

This application claims priority from U.S. Provisional Patent Application Ser. No. 61/438,293, filed Feb. 1, 2011.

BACKGROUND OF THE INVENTION

The invention provides for processes for removing contaminants from gas stream emissions. More particularly, the invention provides for removing contaminants such as nitrogen oxides from gas streams in sulfuric acid production processes.

Sulfuric acid is used in a wide spectrum of process industries. Sulfuric acid is believed to be the world's largest chemical produced. Over past few decades, worldwide, most of the sulfuric acid is produced by a contact process, which involves generating a sulfur dioxide containing gas stream from variety of sulfur sources. Examples include burning elemental sulfur, or process of roasting metal ore or burning $H_2S$ arising from industrial operations such as hydrodesulphurization of petroleum products or simply burning waste containing sulfate or sulfuric acid or combusting spent sulfuric acid all generate $SO_2$ in the gas stream. If the source of sulfur is dirty, the process gas is conditioned and oxidized to convert almost all $SO_2$ to $SO_3$ over a $V_2O_5$ catalyst in a multi pass converter. The oxygen required for oxidation is either present or supplemented in the form of additional air or oxygen. This $SO_3$ containing process gas stream is absorbed in sulfuric acid solution, which results in the $H_2SO_4$ product as a >95% wt acid or oleum of desired strength.

Since sulfuric acid is a very low cost product, and reactions are exothermic, heavy emphasis is put on heat integration and therefore generally most exothermic heat that is recovered is used within the process for captive requirement of energy and any net surplus is exported in the form of steam. Nitrogen oxides ($NO_X$) are generally formed during the $SO_2$ generation step in varying quantities based on a variety of factors. When a $SO_3$ containing process gas stream is absorbed into a sulfuric acid solution, some of the $NO_X$ reacts with a circulating solution of sulfuric acid forming a complex which is referred in the industry as niter (nitrosyl sulfuric acid) and some of its homologs. Niter in the product is an undesirable impurity in many applications and also imparts some color to the product.

Some of the $NO_X$ which leaves the sulfuric acid absorber passes through much of the process equipment and is finally exhausted to the environment. It is often noted that the plume arising from the sulfuric acid production facility is correlated with SOx emissions, $NO_X$ emissions, niter, types of mist eliminating devices and various process parameters. Some of these environmental problems are alleviated in the modern plant by a dual stage absorption process, choosing effective mist elimination devices followed by a caustic scrubber. Selective catalytic reduction (SCR), selective non-catalytic reduction (SNCR) types of processes have been suggested for NOx removal. However, the problems of $NO_X$ emissions, acid plume, deterioration of product quality due to niter and nitrogen containing compounds in sulfuric acid still exists at varying levels in the industry. With increasing environmental concern and government oversight, the present levels of $NO_X$ controls are not adequate.

Sulfuric acid is a high production volume but a low cost and low margin chemical. The cost of a plant producing sulfuric acid is relatively high. The relationship of the capital cost and the plant capacity is not linear. Therefore, plants with a larger production capacity achieve much better scales of economy compared to plants with smaller capacities. Sulfuric acid is a highly reactive chemical and therefore transporting it over long distance is not only expensive but also increasingly hazardous. For a smaller plant operator, it makes good economic sense to boost the capacity of sulfuric acid by employing oxygen enrichment in the $SO_2$ generation and or oxidation stage.

Oxygen enrichment when done to the $SO_2$ generation stage, not only increases throughput, but also can improve thermal efficiency thereby reducing fuel requirements, increasing $SO_2$ concentration in the process gas stream, and exporting more steam and reducing unit product cost. Replacing some of the combustion/oxidation air with gaseous oxygen not only improves capacity of the furnace but also increases $SO_2$ content of the process gas stream exiting the furnace. Generally downstream equipment such as catalytic converters, waste heat recovery equipment, fans, etc. operate more effectively at higher concentration of $SO_2$ and lower process gas flow rates. Typical sulphuric acid processing equipment has adequate processing capacity to handle 30 to 40% additional $SO_2$ load. In the case when $SO_2$ is arising from a metal roasting furnace, oxygen enrichment not only improves sulfuric acid throughput but also enhances ore processing capacity. With all these positive aspects of oxygen enrichment with respect to capacity and costing, there is a major down side. Oxygen enrichment produces higher combustion temperatures in the furnace with greater $O_2$ concentration resulting in higher amount of $NO_X$ formation. Without addressing issues regarding higher environmental emissions and increased niter content of the product, full potential or benefits of oxygen enrichment can not be achieved. FIG. 1 depicts the difficulty in economically justifying smaller size plants due to longer payback period. However with $O_2$ enrichment, this payback period can be significantly reduced.

The sulfur dioxide containing stream when derived from sulfur acid regeneration (SAR) plant or a metal ore processing furnace such as a roaster furnace has high levels of particulate matter and needs to be washed and dried prior to being oxidized to $SO_3$.

U.S. Pat. No. 7,632,475 of common assignment herewith teaches introducing ozone in the $SO_2$ upstream of the particulate scrubber to oxidize insoluble nitrogen oxides to soluble nitrogen oxides followed by removal in a particulate scrubber addressing both the product quality and emissions.

Although a significant portion of heat from the $SO_2$ containing process gas stream is recovered prior to washing in the particulate scrubber, it is not uncommon to find the process gas exiting the heat recovery section to be at significantly higher temperature than that desired for nitrogen oxides oxidation with ozone upstream of the particulate scrubber.

It is known that temperatures exceeding 100° C., and in particular 130° C., performance of ozone oxidation significantly deteriorates. Ozone molecules as well as oxides of nitrogen higher than nitrogen dioxide decompose at elevated temperatures. In order that ozone reacts with all nitrogen oxides molecules, ozone must be well mixed with the bulk of the process gas stream. Ozone must be introduced upstream far enough of the particulate scrubber to provide the necessary mixing and reaction time. For large volumes of the process gas, mixing time may be even larger than the reaction time subjecting ozone and oxidized nitrogen oxides to higher temperatures (above 130° C.) for longer periods of time. At these higher temperatures greater than 130° C., ozone decomposes quickly as well as the highly oxidized nitrogen oxides.

Mixing time in industrial size equipment is generally long and becomes a leading factor in poor performance at higher temperatures.

Additionally, at elevated temperatures and in the presence of high concentrations of sulfur dioxide, oxidation reactions between sulfur dioxides and the higher oxides of nitrogen become important. The higher oxides of nitrogen which are more soluble are wastefully consumed in oxidizing sulfur dioxide. This is significant and this inefficiency is enhanced with increase in the concentration of nitrogen oxides, $N_2O_5$ and temperature as evidenced by reactions (1) and (2) below.

$$SO_2 + NO_3 \rightarrow SO_3 + NO_2 \quad (1)$$

$$SO_2 + N_2O_5 \rightarrow SO_3 + 2NO_2 \quad (2)$$

$NO_2$ solubility is an order of magnitude lower than $N_2O_5$ or $NO_3$ and limits nitrogen oxides removal in a given particulate scrubber by wet scrubbing.

Therefore introducing ozone upstream of the particulate scrubber in a very high concentration, hot sulfur dioxide stream as those found in a sulfuric acid process is not a simple nor an attractive option. Ozone requirements as described in option 1 of the '475 patent can be high. Nitrogen oxides removal may be limited and the formation of $SO_3$ upstream of the particulate scrubber can be a concern.

A different approach was described in U.S. patent application Ser. No. 12/617,356, filed Nov. 12, 2009, of common assignment herewith, which suggested that the addition of ozone after initial particulate scrubbing stage at a suitable location in the droplet disengagement zone. The temperature in this zone is below 100° C. and suitable for effective nitrogen oxides oxidation with ozone.

This approach is good when nitrogen oxides concentration is low, however oxygen enrichment in furnaces, oxy-fuel combustion and higher furnace temperatures often result in extremely high concentration of nitrogen oxides in sulfur dioxide containing process gas streams. At these high concentrations of nitrogen oxides, ozone addition will result in substantial concentrations of $N_2O_5$ making sulfur dioxide oxidation with $N_2O_5$ even at lower temperatures relevant and undesirable.

Treating high concentrations of nitrogen oxides with ozone can also be cost prohibitive due to the low market value of sulfuric acid. Additionally, the large amount of nitric acid/nitrate that is generated in the purge stream from a particulate scrubber is an important consideration for disposal.

The invention recognizes the inefficiencies in the prior treatment processes and provides a method for removing contaminants such as nitrogen oxides from process gas streams resulting from sulfuric acid production processes.

In the present invention, nitrogen oxides are only partially oxidized by ozone. The oxidation is accomplished by adding ozone in a sub stoichiometric quantity. Nitrogen oxides removal is accomplished by establishing parametric conditions (Suchak et al, 1990) that enhance the formation and the absorption of nitrous acid in the particulate scrubber or downstream equipment. However, instead of absorbing in an alkaline medium, absorption of nitrous acid occurs in a neutral or acidic medium. Nitrous acid in the scrubber's aqueous phase is fed with small amounts of urea or ammonia or other compound that can provide an ammonical radical for the decomposition of nitrous acid. By maintaining the desired decomposition conditions, nitrous acid decomposes in the liquid phase to nitrogen, carbon dioxide and water. Therefore, this invention not only requires less ozone but also minimizes nitrate in the purge streams from the particulate scrubber or the wet scrubber.

SUMMARY OF THE INVENTION

The invention provides for a method for removing contaminants from a process gas stream in a sulfuric acid production process comprising the steps:
a) directing the process gas stream to a particulate scrubber;
b) contacting the process gas stream with ozone at less than stoichiometric amounts;
c) scrubbing partially oxidized nitrogen oxides in the particulate scrubber;
d) establishing conditions under which nitrous acid is formed and absorbed;
e) feeding a compound selected from the group consisting of urea, ammonia and a compound that can provide an ammonical radical to the aqueous phase of the particulate scrubber;
e) directing the process gas stream to a gas dryer; and
f) recovering the process gas stream.

The invention further provides for a method for removing contaminants such as oxides of nitrogen from a process gas stream from a sulfuric acid production process comprising the steps:
a) feeding the process gas stream to a particulate scrubber;
b) introducing ozone into the process gas stream at less than stoichiometric amounts with the oxides of nitrogen and scrubbing the partially oxidized oxides of nitrogen in the scrubber, wherein introduction of the ozone is upstream, downstream or in the particulate washing step or the scrubber;
c) establishing conditions in the scrubber to facilitate the formation of nitrous acid;
d) feeding a compound selected from the group consisting of urea, ammonia and a compound that can provide an ammonical radical to the aqueous phase of the particulate scrubber;
e) absorbing nitrous acid in a neutral or acidic medium; and
f) recovering the process gas stream.

NOx removal is performed by partial oxidation followed by absorption in a wet scrubber as nitrous acid and decomposition in the liquid phase with urea, ammonia or a compound having or being capable of providing an ammonical radical in the liquid phase.

Advantages of this process include cost savings due to reduced quantity of ozone required and fewer nitrates in the scrubber purge which has to be contended with because of environmental discharge concerns.

In the invention, nitrogen oxides are only partially oxidized by ozone whereas earlier processes taught almost complete oxidation of the nitrogen oxides. The oxidation is accomplished by adding ozone in sub-stoichiometric quantities (⅓ of what is typically needed). If all of $NO_X$ in the process gas is in the form of NO, only 0.5 mole of ozone is required per mole of NO whereas stoichiometric quantity to oxidize NO to $N_2O_5$ is 1.5 mole of ozone.

Nitrogen oxides removal is accomplished by establishing parametric conditions that enhance formation and absorption of nitrous acid in the particulate scrubber or in downstream equipment. Some of the important parameters are humidity, temperature of the aqueous phase or scrubbing medium and ratio of NO to $NO_2$ (Suchak et al 1990). Instead of absorbing in the alkaline medium, the invention claims absorption of nitrous acid in a neutral or acidic medium. Nitrous acid in the scrubber's aqueous phase is fed with small amounts of urea or ammonia or any other compounds that provide an ammonical radical for decomposition of nitrous acid. The nitrous acid decomposes in the liquid phase to nitrogen, carbon dioxide and water by maintaining the desired decomposition conditions.

For example, conditions under which nitrous acid is formed and absorbed are temperatures inside the particulate scrubber greater than 40° C.; a process gas stream in the scrubber that is saturated in moisture (humidity) at 40° C. or higher; controlling the addition of the ozone to the process gas steam such that the molar ratio of ozone to nitrogen oxides is around 0.5; and maintaining the partial pressures of divalent nitrogen oxides and tetravalent nitrogen oxides greater than 1 in the particulate scrubber. These partial pressures are designated $P_{NO}*/P_{NO2}*>1$.

The contaminants to be removed are primarily selected from the group consisting of sulfur oxides and nitrogen oxides. The less than stoichiometric amounts is typically one-third the amount of ozone necessary to oxidize nitrogen oxides. Ozone is typically 10 weight percent ozone in oxygen. The process gas stream and ozone are mixed prior to the process gas stream entering the particulate scrubber. The process gas stream may be quenched prior to it being mixed with the ozone.

The conditions under which nitrous acid is formed and absorbed are in the particulate scrubber. The absorption of nitrous acid is in a neutral or acidic medium.

The partial oxidation is performed in a process gas stream selected from the group consisting of upstream, within and downstream of a particulate scrubber.

A different gas-liquid contacting device with an aqueous scrubbing medium may be used in addition to the particulate scrubber.

Air may be injected into the recovered process gas stream prior to it entering the gas dryer.

The process gas stream from the dryer may be fed to series of heat exchangers and $SO_2$ to $SO_3$ converter and then to a sulfuric acid absorption tower.

DETAILED DESCRIPTION OF THE INVENTION

Figure 1:
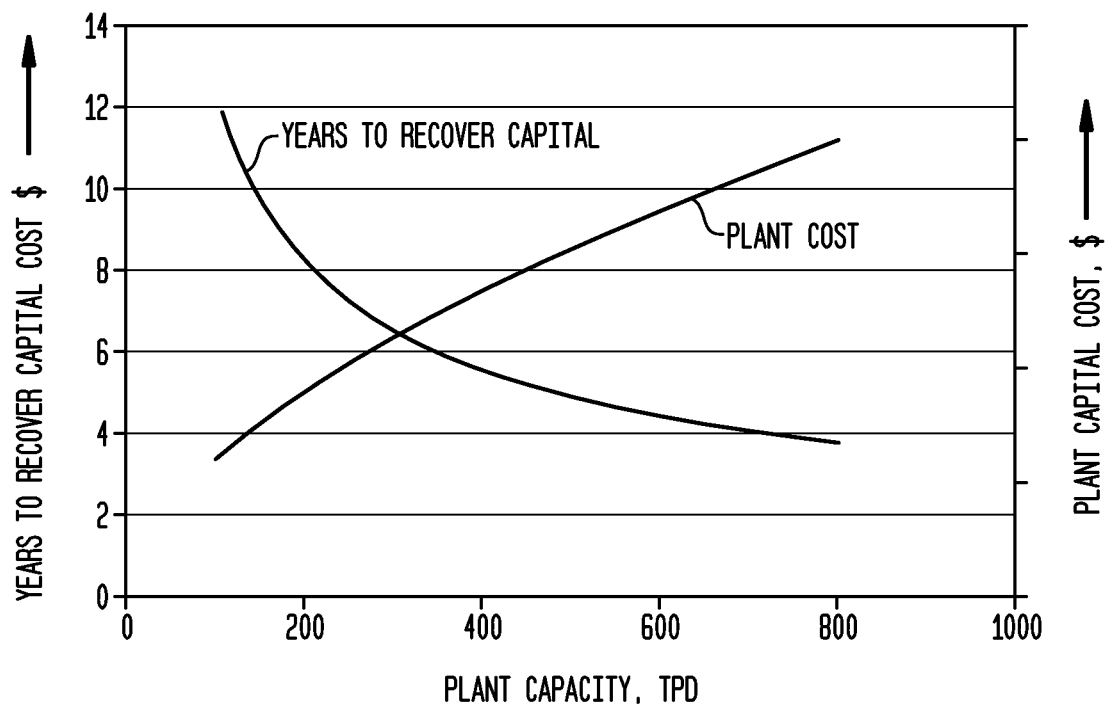
FIG. 1 is a graph showing plant capacity for a sulfuric acid regeneration plant versus cost recovery.

Partial oxidation of nitrogen oxides by ozone is performed in a process gas stream upstream, within or downstream of a particulate washing step or aqueous scrubber.

A Sulfuric Acid Regeneration (SAR) plant and acid recovery system on a metal ore roaster furnace is a slightly modified form of a sulfur burning sulfuric acid plant. In all three types of plants, a source of sulfur is converted to $SO_2$ in the process gas. In the first two types of plants, $SO_2$ containing streams have particulate matter and other acidic contaminants and need to be washed and dried prior to oxidizing to $SO_3$. The clean and dry $SO_2$ containing stream is passed through a series of heat exchangers and beds of $V_2O_5$ catalyst to convert it to $SO_3$ at about 425 to 550° C. Typically 3 to 4 catalyst beds called converters are used. The heat from the process gas stream exiting the final converter bed is used in heating the process gas entering the converter by series of cascaded heat exchanger. $SO_3$ is absorbed in the sulfuric acid absorber to form oleum or 98% sulfuric acid and some product is continuously removed.

In the newer sulfuric acid plants, the process gas stream from the absorber is again heated and passed through a $V_2O_5$ bed to oxidize residual amounts of $SO_2$ and then subjected to another absorber to remove almost all of sulfur as $SO_3$. The process gas from the 2nd absorber is passed through a candle mist eliminating device to remove $H_2SO_4$ mist and finally scrubbed with caustic soda in an environmental scrubber before exhausting through the stack. Environmental scrubbers are not always employed and mostly configured in the train to meet the local regulations governing $SO_2$ emissions.

The main difference between a traditional sulfur burning sulfuric acid and an acid recovery or SAR unit is how the sulfur source is converted to $SO_2$. A SAR unit as shown in the FIG. 3 uses a furnace to convert spent sulfuric acid to $SO_2$. Since decomposition of $H_2SO_4$ is endothermic and favored by raising the temperature, natural gas or hydrocarbon feedstock is required to raise temperature of the furnace. Generally finely atomized sulfuric acid is held at 650° C. or higher for a sufficient time to obtain 99.5% conversion. A supplemental feed stream of $H_2S$ can be fed to this furnace for three primary reasons, 1) $H_2S$ has a calorific value 2) it is a good source of sulfur and 3) there is a monetary benefit in taking care of $H_2S$. The process gas stream exiting the SAR furnace, in addition to $SO_2$, has other contaminants, such as fly ash, etc. After recovering the heat in the waste heat boiler, the process gas is around 130° C. to 250° C. This process gas is subjected to an aqueous wash to remove particulate matter, fly ash and other impurities. The process gas is then dried by scrubbing with sulfuric acid and forwarded to a series of heat exchangers and converters.

In a conventional sulfuric acid plant, molten elemental sulfur is burnt in a furnace to form sulfur dioxide. In contrast to SAR, $SO_2$ produced from elemental sulfur is relatively free from dust, fly ash and other contaminants and does not require "washing" or scrubbing. The $SO_2$ containing gas stream from the furnace can be directly led to series of waste heat boilers, converters and heat exchangers. Therefore sulfur burning sulfuric acid plants export as much as 1.4 tons of steam per ton of sulfuric acid produced.

Some $NO_x$ is always produced in furnaces where $SO_2$ is generated. The sulfuric acid decomposition reaction in the SAR process, in particular, is favored by higher furnace temperature which in turn causes some of the nitrogen to convert to nitric oxide in the furnace. Some organic nitrogen content in the spent sulfuric acid converts to nitric oxide in the furnace. To assure adequate destruction of organic matter in spent sulfuric acid and for decomposition of sulfuric acid into $SO_2$, a certain residence time is required at furnace temperature. To increase SAR unit throughput (up to 30%) the furnace is often supplemented with pure oxygen stream. All these lead to formation of NOx in the furnace.

NOx formed consists mainly of NO and a small quantity of $NO_2$. Both nitric oxide (NO) and nitrogen dioxide ($NO_2$) are sparingly soluble gases. They are not significantly removed in the particulate scrubbers and pass along with process gas through converters to the sulfuric acid absorber. Some of NO and $NO_2$ reacts with the sulfuric acid and forms nitrosyl sulfuric acid "niter" and its homologs that impart a violet coloration to the sulfuric acid product. Industrial sulfuric acid users are sensitive to concentrations of "nitrogen" or "niter" in the sulfuric acid. The process gas exiting the sulfuric acid absorber still has an equilibrium concentration of NO, some of which further condenses in the candle mist eliminator as niter. Finally the remainder of NO exits the sulfuric acid plant as an exhaust gas stream which is emitted to the atmosphere via the stack.

Figure 2:
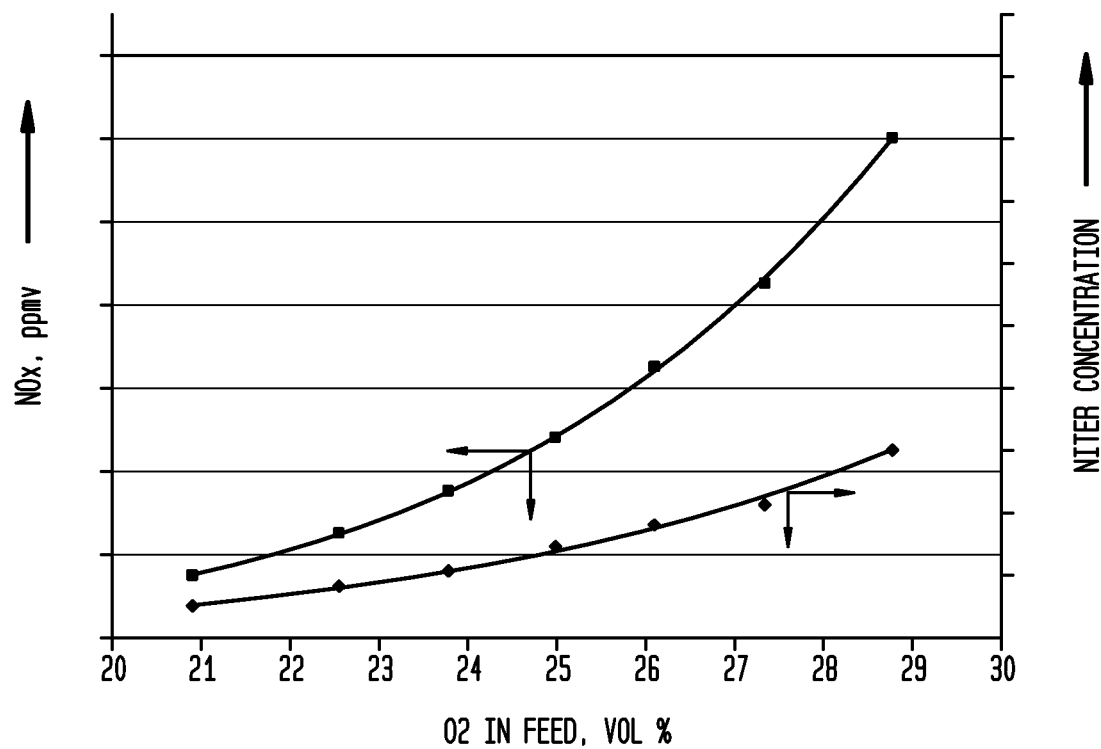
FIG. 2 is a graph showing oxygen enrichment effects on emissions and product quality.

In order to increase the production capacity in the existing SAR furnace or metal ore kiln, the feed air can be supplemented or partly substituted with oxygen. FIG. 2 depicts the effect of $O_2$ enrichment on stack emissions and product quality. As shown in FIG. 2 with an increase in $O_2$ concentration in the feed, $NO_X$ content in the flue gas through stack rapidly increases and so does the niter content of the product acid.

Therefore it is very likely that the enrichment that provides up to 30% more throughput can cause issues with the environment and product quality. In addition, although exact reasons are not known but higher niter content in the product acid is also associated with visible plume at the stack.

Many geographical regions in the United States such as the North-East, Houston-Galveston and California regions fall under ozone non-attainment area rules and regulations. The control of $NO_X$ emissions is a primary concern for local, state and federal environmental protection authorities.

The Clean Air Act of 1990 and the Interstate Air Quality Rules (IAQR) mandate the USEPA, state and local air-quality management authorities to implement tougher standards to improve air quality. Most existing refineries that generate spent sulfuric acid are on the east coast, gulf coast and along the west coast of the United States. The amount of spent sulfuric acid generated by an individual refinery is not large enough for an economically viable SAR unit. Therefore a separate unit that can process spent sulfuric acid streams from more than one refinery is more preferable. Such a unit becomes a new and independent source and therefore is outside the bubble permit of any one refinery.

Sulfuric acid is a very low value commodity and is hazardous cargo to haul. There is also increasing pressure on refineries to reduce sulfur content of liquid fuels (diesel). It is therefore of interest to set up a spent sulfuric acid plant in the vicinity of refineries where spent and product sulfuric acid can be exchanged via pipeline. In addition, SAR units can also advantageously process additional amounts of $H_2S$ generated by these refineries. However, such a location as mentioned above invites close scrutiny in environmental permitting and mandates industry to pursue gas pollution control devices that meet MACT standards.

Figure 3:
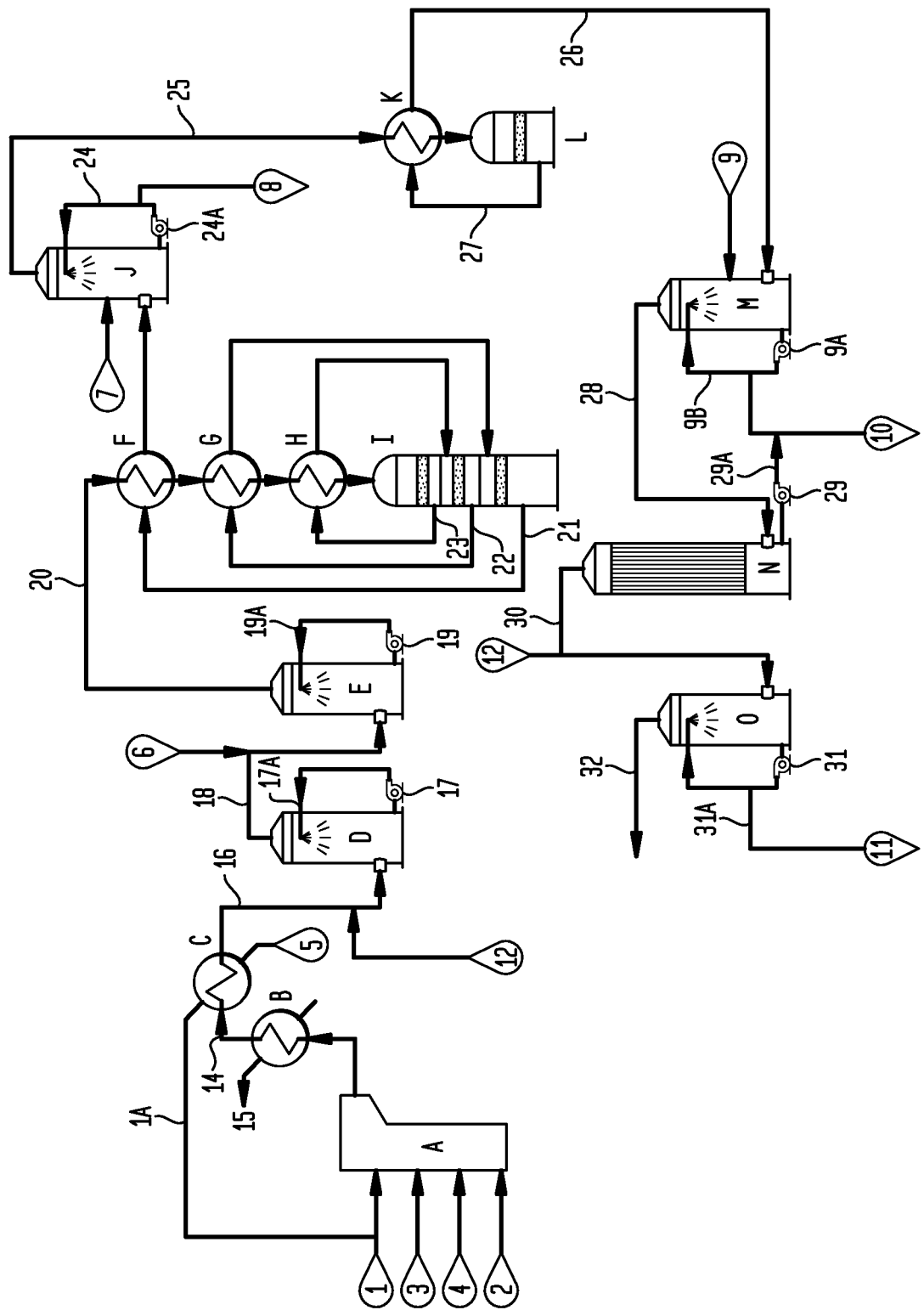
FIG. 3 is a schematic representation of a sulfuric acid regeneration (SAR) process integrated with a nitrogen oxides reduction scheme.

Turning to the FIG. 3, a furnace A is fed through line 1 with fuel gas. Spent acid is fed through line 2 and oxygen and hydrogen sulfide are fed through lines 3 and 4 respectively. Process gas from the furnace A will leave through line 13 and enter waste heat boiler B. Steam from the waste heat boiler B will exit through line 15. The cooler process gas exits waste heat boiler B through line 14 and enters air heater C which is fed air through line 5. Hot air from the air heater C will also be directed through line 1A into line 1 for the fuel gas being fed to the furnace. In an alternate configuration lines 3 and lines 4 can be also directed into line 1.

The process gas stream will leave air heater C through line 16 and be directed into the particulate scrubber D. The first option of the present invention begins here with the introduction of ozone through line 12 such that the process gas stream and ozone are mixed together prior to the process gas stream entering the particulate scrubber D. If the process gas temperature entering the particulate scrubber D exceeds 135° C., the process gas may be quenched prior to mixing with ozone. The scrubbed process gas stream will exit the particulate scrubber through line 18. The scrubbing solution 18A is pumped out of particulate scrubber D through pump 17 and directed into the spray header assembly 17D through line 17A. The line 17B (referring to FIG. 4) directs part of the scrubbing solution to the nozzle or a stage that is responsible for quenching and wetting the incoming hot process gas stream through spray header assembly 17E.

The solution containing Urea, ammonia or compounds that can provide ammonical nitrogen is fed in the scrubber by line 17C. The scrubber is also fed with make up water (not shown) to maintain the liquid level in the scrubber sump and purge line and purge to limit concentration of dissolved and suspended solids.

The wet process gas stream in line 18 has air injected into it through line 6 and this stream now enters the gas drying tower E. The solution used in the gas drying tower E (generally $H_2SO_4$) is pumped out through pump 19 and reenters the tower via liquid distributor through line 19A. Some circulating $H_2SO_4$ from this tower is exchanged with Sulfuric Acid absorption tower J. This circuit is not depicted in the diagram. Dry process gas leaves the gas drying tower E through line 20 and this gas stream is at about 65° C. This dry process gas stream will enter a series of heat exchangers, in this example F, G and H respectively through line 20 before entering the converter I. Converter I has through separate converters present therein containing catalytic materials which will convert the clean and dry sulfur dioxide gas stream entering the converter I into sulfur trioxide.

The sulfur trioxide generated by the catalytic conversion will exit the converter I through line 23 and be directed to the first heat exchanger H where it will be cooled and reenter the converter I at a point lower than when it was removed. The same holds true with sulfur trioxide withdrawn through line 22 where it will enter the second heat exchanger G and reenter the converter I at a point lower than where it was removed. Lastly the converted sulfur trioxide is withdrawn from the bottom of the converter I through line 21 and will pass through the third heat exchanger before it enters the sulfuric acid absorption tower J. The heat exchange system may also have the provision to produce steam. Oxidation of $SO_2$ to $SO_3$ is highly exothermic and occurs at high temperatures in industrial applications. Normal practice is to carry it out in the temperature range in excess of 425° C. There are many configurations practiced in meaningful recovery and use of heat. The present invention is applicable to all the configurations. For the sake of brevity we have described only one of them in this example.

Sulfuric acid is fed into the sulfuric acid absorption tower through line 7 and the absorbing solution will exit through pump 24 through line 24A which feeds the absorbing solution into the liquid distributor at the top of the sulfuric acid absorption tower J. Oleum or sulfuric acid as product is withdrawn through line 8. The gas stream which has much of its sulfuric acid content removed will leave the absorption tower J through line 25 and enter the final heat exchanger K before entering the final converter L. The final converter L will contain catalytic material which will again convert any residual sulfur dioxide into sulfur trioxide.

The process gas stream exiting the converter which now contains little sulfur dioxide is directed through line 26 into the final sulfuric acid absorption tower M. Sulfuric acid is circulated into this tower. The scrubbing solution (sulfuric acid) is recovered through pump 9A and fed back to the liquid distributor through line 9B. Some sulfuric acid (product) is also withdrawn from 9A via line 10. A sulfuric acid solution is added to absorption Tower M through line 9. The scrubbed process gas will leave the final sulfuric acid absorption tower through line 28 and will enter the candle mist eliminator N. The candle mist eliminator N will contain mesh or other gas filtering devices to separate the gas mixture entering the eliminator which contains sulfur dioxide, some sulfuric acid (in the form of $SO_3$ mist), nitrogen oxides, carbon dioxide and oxygen and nitrogen. The residual sulfuric acid which is separated from the gas mixture will leave the candle mist eliminator through pump 29 and be directed into feed line 10. Sometimes, the collection from the mist eliminator is not mixed with the product acid (in line 10) and separately processed as it may have higher concentration of niter.

The separated gas stream which still contains nitrogen oxides will leave the candle mist eliminator N through line 30. Ozone is injected into this line through line 12A so that it mixes with the process gas stream containing the nitrogen oxides before entering the environmental scrubber O. The ozone injection spot in the line 30 is so chosen as to provide adequate residence time for ozone to mix and oxidize $NO_X$ prior to entering the Scrubber O. Ozone is injected via nozzle (s) or perforated tube to ensure thorough mixing within bulk of the gas stream.

In the scrubber O the solution will scrub the nitrogen oxides and sulfur oxides remaining in the gas mixture. Scrubber solution is drawn from the environmental scrubber O through pump 31 and bled from the system through scrubber bleed line 11. What solution is not bled off is directed back into the environmental scrubber O into its spray headers through line 31A. The process gas that is now substantially free of nitrogen oxides and sulfur oxides will leave the environmental scrubber O through line 32 to be directed to the stack. The pH of the environmental scrubber is maintained by feeding caustic soda or alkaline carbonates which is not depicted in the FIG. 4.

When $SO_X$, present in the line 30 is low, sulfite generated in-situ in the environmental scrubber O may not be enough to deplete the unreacted ozone. A small feed of sodium sulfite, thiosulfate or reduced sulfur may also be fed to maintain sulfite concentration in the environmental scrubber necessary to deplete ozone.

Figure 4:
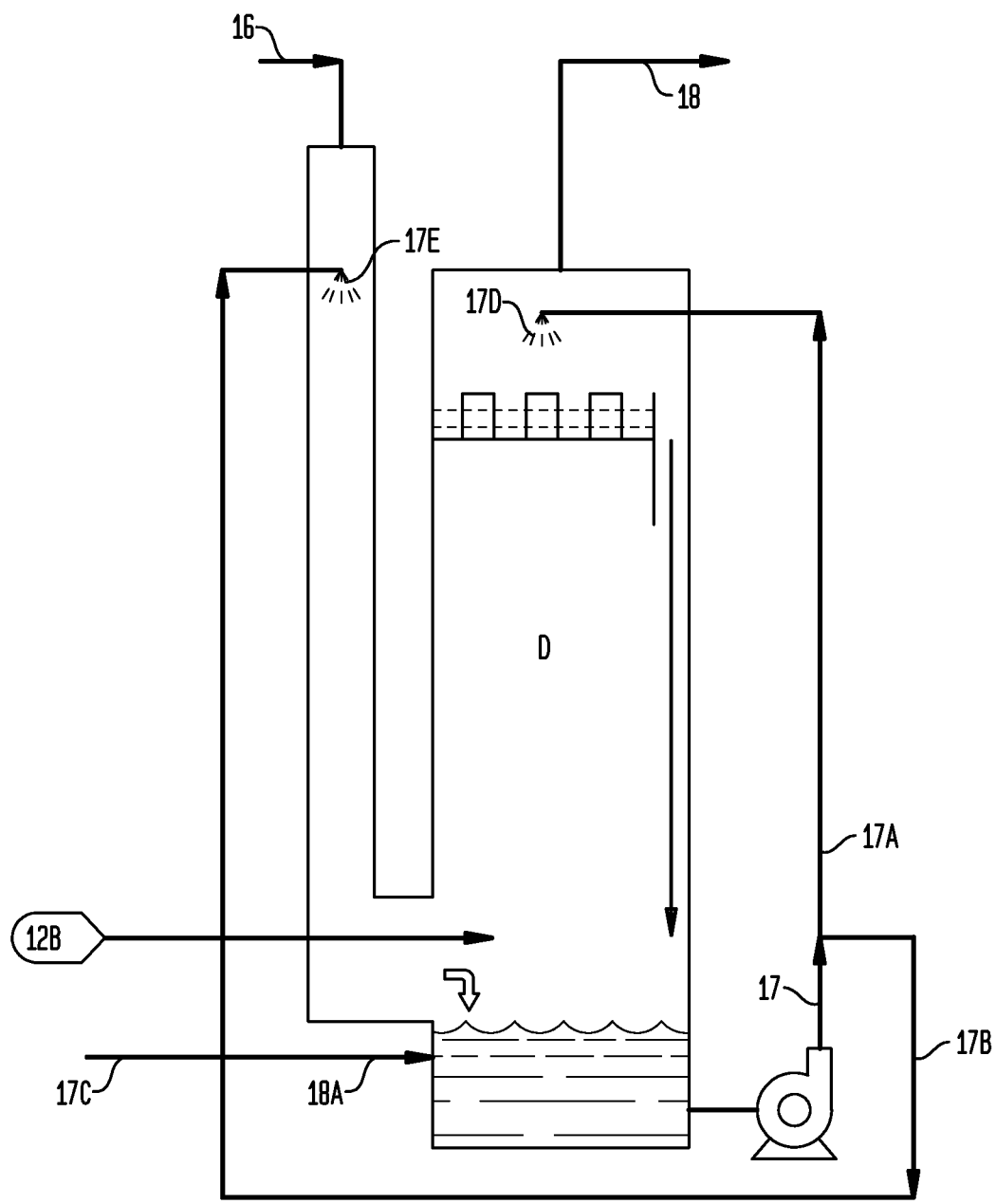
FIG. 4 is a schematic representation of the particulate scrubber as used in the invention.

Referring now to FIG. 4, the particulate scrubber D from FIG. 3 is shown in larger size and greater detail.

The process gas stream will enter the particulate scrubber D through line 16. The scrubbed process gas stream exits the particulate scrubber through line 18. The scrubbing solution 18A is pumped through pump 17 and line 17A to the scrubber head assembly 17D. The aqueous solution that contains urea, ammonia or compounds that can provide ammonical nitrogen is fed into the particulate scrubber D through line 17C.

Part of the scrubbing solution can be diverted through line 17B and fed to spray header assembly 17E where it scan be used to quench the incoming process gas stream through line 16 when it is necessary to reduce the temperature of the process gas stream.

When the temperature of the process gas in line 16 is above 135° C., ozone may be added after quenching using line 12B instead of line 12.

In order to practice the process disclosed in this invention, the quantity of ozone in the line 12 or 12B must be maintained substoichiometric to limit the oxidation of nitrogen oxides. As stated earlier, if all the nitrogen oxides are in the form of nitric oxide (NO), the stoichiometric amount of ozone required to convert NO to $N_2O_5$ is 1.5 moles of ozone per mole of nitrogen oxides.

Nitrogen oxide oxidation to $N_2O_5$ involves several reactions but can be represented by three reactions:

$$NO+O_3 \rightarrow NO_2+O_2 \qquad (3)$$

$$NO_2+O_3 \rightarrow NO_3+O_2 \qquad (4)$$

$$NO_2+NO_3 \rightarrow N_2O_5 \qquad (5)$$

Reaction (3) is an order of magnitude faster compared to reactions (4) and (5). Therefore, if the amount of ozone added is limited to 0.5 mole of ozone per mole of nitrogen oxide, the oxidation of $NO_2$ forming $NO_3$ is inhibited and the resulting process gas stream will have approximately equimolar amounts of NO and $NO_2$.

In the gas phase small quantities of $N_2O_3$ and $N_2O_4$ are formed as well. NO reacts with $NO_2$ forming $N_2O_3$ until it reaches an equilibrium concentration. $N_2O_4$ is also formed as a result of $NO_2$ dimerization reaction.

$$NO_2 \leftrightarrow N_2O_4 \qquad (6)$$

$$NO+NO_2 \leftrightarrow N_2O_3 \qquad (7)$$

No $N_2O_5$ formation occurs as it requires $NO_3$ formation and since ozone is added in sub stoichiometric amounts (Ozone/nitrogen oxides ratio around 0.5), virtually no ozone is left in the process gas stream following the partial oxidation of nitrogen oxide.

Both $N_2O_4$ and $N_2O_3$ possess higher solubility compared to NO and $NO_2$ but they are far less soluble compared with $N_2O_5$ and removal by scrubbing in a particulate scrubber is not an attractive option. $HNO_2$ is far more soluble than $N_2O_4$ and $N_2O_3$. If $N_2O_3$ (or NO and $NO_2$) is subjected to high water vapor in the gas phase, appreciable amounts of nitrous acid forms. Absorption is enhanced by maintaining a suitable NO and $NO_2$ ratio and scrubbing at elevated temperatures, which increases the water vapor content and formation of nitrous acid. The sulfur dioxide process gas stream upstream of the particulate scrubber exiting heat recovery equipment is always substantially hot and contacting this hot process gas in the particulate scrubber with aqueous phase raises the temperature of the aqueous scrubbing medium in the scrubber due to adiabatic contacting which consequently raises water vapor content of the quenched sulfur dioxide process gas. With high moisture content and warmer temperature in scrubbing, nitrous acid formation is thus maximized in the gas phase.

Gas phase equilibrium is shown in reactions (8) and (9):

$$NO+NO_2+H_2O(g) \leftrightarrow 2HNO_2(g) \qquad (8)$$

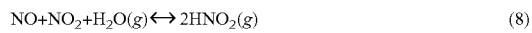

$$N_2O_3+H_2O(g) \leftrightarrow 2HNO_2(g) \qquad (9)$$

Due to the high solubility of $HNO_2$, it dissolves readily in the aqueous medium by absorption.

Absorption is presented as:

$$HNO_2(g) \leftrightarrow HNO_2(l) \qquad (10)$$

In a gas-liquid contacting device for particulate removal, whether it is spray, packed column or plate column, removal of nitrous acid from the gas phase by absorption initiates formation of nitrous acid to re-establish equilibrium in the gas phase. The formation of nitrous acid and removal by absorption occurs simultaneously and continuously as the process gas continues its contact with liquid and moves along from entry to exit of the gas-liquid ontacting device. The scrubbing medium and the process gas may contact in co-current or counter-current fashion. (Refer to FIG. 4 for an example)

Although a fraction of nitrogen oxides that forms nitrous acid due to gas equilibrium reaction is small, the continuous removal makes this approach appropriate for a particulate scrubber to expeditiously and simultaneously remove nitrogen oxides along with particulates.

Suchak et al. (I&EC, 1990) have shown that selectivity towards nitrite can be greatly improved by limiting oxidation of $NO_X$ and adjusting parametric conditions responsible for the formation of nitrous acid. Furthermore, in the manufacture of nitrite, absorption of $NO_X$ is enhanced by faster transport of NO and $NO_2$ to the gas-liquid interface in the scrubber which enhances formation of $HNO_2$ at the gas-liquid interface. The same mechanism also applies for nitrous acid absorption in the acidic medium as stated in this invention.

The aqueous scrubbing medium containing dissolved nitrous acid if further reacted with urea, ammonia or compounds that contain ammonia or capable of providing an ammonical radical. Urea may be introduced either in the aqueous scrubber circulation system or added to the purge of aqueous medium.

The reaction of nitrous acid with urea is described in equation (11):

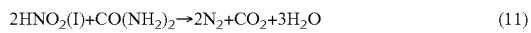
$$2HNO_2(I)+CO(NH_2)_2 \rightarrow 2N_2+CO_2+3H_2O \qquad (11)$$

This reaction also needs an aqueous medium to be maintained in acidic conditions.

In the particulate scrubber, with aqueous scrubbing, some sulfurous and sulfuric acids are always formed in the aqueous medium due to dissolution of sulfur dioxide and sulfur trioxide providing suitable necessary acidic conditions for nitrous acid reaction with urea or ammonia.

Nitrogen and carbon dioxide are released from the liquid phase and captured nitrogen oxides are converted to nitrogen. Therefore, by oxidation of nitrogen oxides with sub stoichiometric amounts of ozone, converting to nitrous acid and decomposing to nitrogen, a more advantageous nitrogen oxides treatment is realized.

Unlike nitrogen oxides oxidation with stoichiometric quantity of ozone, the partial oxidation of nitrogen oxides does not lead to formation of nitric acid. The partial oxidation of nitrogen oxides has less deterioration of performance with commensurate increase in temperature above 100° C. Partial oxidation being faster, oxidation of nitrogen oxides (nitrogen oxide to $NO_2$) occurs within the ozone mixing zone. Therefore, by efficiently mixing ozone with the process gas stream, ozone can be introduced upstream, downstream or within many of the industrially available particulate scrubbers such as EDV scrubber offered by Belco Technologies and Dynawave offered by MECS. When ozone is introduced downstream of particulate scrubber, an additional gas-liquid contacting device with aqueous scrubbing medium is required which not only removes $HNO_2$ formed in the gas phase but also decomposes absorbed nitrous acid to $N_2$.

While this invention has been described with respect to particular embodiments thereof, it is apparent that numerous other forms and modifications of the invention will be obvious to those skilled in the art. The appended claims in this invention generally should be construed to cover all such obvious forms and modifications which are within the true spirit and scope of the invention.

Having thus described the invention, what I claim is:

1. A method for removing contaminants from a process gas stream in a sulfuric acid production process comprising the steps: a) directing the process gas stream to a particulate scrubber; b) contacting the process gas stream with ozone at less than stoichiometric amounts; c) scrubbing partially oxidized nitrogen oxides in the particulate scrubber; d) establishing conditions under which nitrous acid is formed and absorbed; e) feeding a compound selected from the group consisting of urea, ammonia and a compound that can provide an ammonical radical to the aqueous phase of the particulate scrubber; e) directing the process gas stream to a gas dryer; and f) recovering the process gas stream.

2. The method as claimed in claim 1 wherein said contaminants are selected from the group consisting of sulfur oxides and nitrogen oxides.

3. The method as claimed in claim 1 wherein said less than stoichiometric amount is one-third the amount of ozone necessary to oxidize nitrogen oxides.

4. The method as claimed in claim 1 wherein said conditions under which nitrous acid is formed and absorbed are in the particulate scrubber.

5. The method as claimed in claim 1 wherein said partial oxidation is performed in a process gas stream selected from the group consisting of upstream, within and downstream of a particulate scrubber.

6. The method as claimed in claim 1 wherein said process gas stream and ozone are mixed prior to the process gas stream entering the particulate scrubber.

7. The method as claimed in claim 1 wherein said process gas stream is quenched prior to mixing with ozone.

8. The method as claimed in claim 1 wherein air is injected into said process gas stream prior to entering said gas dryer.

9. The method as claimed in claim 1 wherein said absorption of nitrous acid is in a neutral or acidic medium.

10. The method as claimed in claim 1 further comprising a different gas-liquid contacting device with aqueous scrubbing medium.

11. The method as claimed in claim 1 wherein said recovered process gas stream is oxidized using catalytic converters and then fed to a sulfuric acid absorption tower.

12. The method as claimed in claim 1 wherein said ozone is up to 10 weight percent ozone in oxygen.

13. A method for removing contaminants from a process gas stream from a sulfuric acid production process comprising the steps: a) feeding the process gas stream to a particulate scrubber; b) introducing ozone into the process gas stream at less than stoichiometric amounts with the oxides of nitrogen and scrubbing the partially oxidized oxides of nitrogen in the scrubber; c) establishing conditions in the scrubber to facilitate the formation of nitrous acid; d) feeding a compound selected from the group consisting of urea, ammonia and a compound that can provide an ammonical radical to the aqueous phase of the particulate scrubber; e) absorbing nitrous acid in a neutral or acidic medium; and f) recovering the process gas stream.

14. The method as claimed in claim 13 wherein said contaminants are selected from the group consisting of sulfur oxides and nitrogen oxides.

15. The method as claimed in claim 13 wherein said less than stoichiometric amount is one-third the amount of ozone necessary to oxidize nitrogen oxides.

16. The method as claimed in claim 13 wherein said conditions under which nitrous acid is formed and absorbed are in the particulate scrubber.

17. The method as claimed in claim 13 wherein said partial oxidation is performed in a process gas stream selected from the group consisting of upstream, within and downstream of a particulate scrubber.

18. The method as claimed in claim 13 wherein said process gas stream and ozone are mixed prior to the process gas stream entering the particulate scrubber.

19. The method as claimed in claim 13 wherein said process gas stream is quenched prior to mixing with ozone.

20. The method as claimed in claim 13 wherein air is injected into said process gas stream prior to entering said gas dryer.

21. The method as claimed in claim 13 wherein said absorption of nitrous acid is in a neutral or acidic medium.

22. The method as claimed in claim 13 further comprising a different gas-liquid contacting device with aqueous scrubbing medium.

23. The method as claimed in claim 13 wherein said recovered process gas stream is fed to a sulfuric acid absorption tower.

24. The method as claimed in claim 13 wherein said ozone is up to 10 weight percent ozone in oxygen.

* * * * *